(12) United States Patent  (10) Patent No.: US 7,617,898 B2
Leong  (45) Date of Patent: Nov. 17, 2009

(54) SYSTEM CONFIGURED TO LIFT HOOD OF VEHICLE

(75) Inventor: Loo Weng Leong, Chiryu (JP)

(73) Assignee: Mitsubishi Jidosha Kogyo Kabushiki Kaisha, Tokyo (JP)

( * ) Notice: Subject to any disclaimer, the term of this patent is extended or adjusted under 35 U.S.C. 154(b) by 0 days.

(21) Appl. No.: 12/155,427

(22) Filed: Jun. 4, 2008

(65) Prior Publication Data

US 2009/0050388 A1  Feb. 26, 2009

(30) Foreign Application Priority Data

Aug. 23, 2007  (JP) ............................ P2007-216945

(51) Int. Cl.
*B62D 25/10* (2006.01)
(52) U.S. Cl. .................... 180/69.2; 180/69.21
(58) Field of Classification Search ................ 180/69.2, 180/69.21
See application file for complete search history.

(56) References Cited

U.S. PATENT DOCUMENTS

| 6,439,330 | B1 * | 8/2002 | Paye ........................ 180/69.21 |
| 6,834,735 | B2 * | 12/2004 | Kim ......................... 180/69.21 |
| 6,868,930 | B2 * | 3/2005 | Brogly et al. ............. 180/69.21 |
| 7,000,720 | B2 * | 2/2006 | Polz et al. ................. 180/69.21 |
| 2005/0257980 | A1 | 11/2005 | Green et al. |
| 2006/0131086 | A1 * | 6/2006 | Lutter et al. .............. 180/69.21 |
| 2007/0062748 | A1 * | 3/2007 | Erwin ...................... 180/69.21 |

FOREIGN PATENT DOCUMENTS

| JP | 2005-225392 A | 8/2005 |
| JP | 2006-524164 | 10/2006 |
| JP | 2007-515326 | 6/2007 |

* cited by examiner

*Primary Examiner*—Lesley D. Morris
*Assistant Examiner*—Katy Meyer
(74) *Attorney, Agent, or Firm*—Birch, Stewart, Kolasch & Birch, LLP (57) ABSTRACT

A system configured to lift a hood includes: a first mounting member, provided on a rear part of the hood; a second mounting member, provided on a body of the vehicle body; a connecting member, including: a first portion, supported on a first position of the first mounting member; and a second portion, supported on the second mounting member; a detector, configured to detect a collision of the vehicle body with an object; an actuator, configured to lift the rear part of the hood when the detector detects the collision; and a stopper, configured to restrict a rising amount of the hood, the stopper including: a third portion, s supported on the first mounting member, the third portion being located in a rear side of the first portion; and a fourth portion, supported on the second mounting member coaxially with the second portion.

5 Claims, 14 Drawing Sheets

SYSTEM CONFIGURED TO LIFT HOOD OF VEHICLE

BACKGROUND

1. Field of the Invention

The present invention relates to a vehicle hood raising system and more particularly to a technique for reducing an impact imparted to a pedestrian when a vehicle collides with the pedestrian by raising a hood of the vehicle to secure an amount of space enabling the reduction in impact within an engine compartment.

2. Description of the Related Art

In recent years, taking it into consideration to secure the safety of pedestrians, vehicles have been developed which include an impact absorbing mechanism on a hood at a front part thereof in anticipation of a collision with a pedestrian.

For example, there exists a technique in which a pedestrian is prevented from striking an underhood hard component such as an engine when the pedestrian collides against a hood of a vehicle by lifting a rear side of the hood to secure a sufficient amount of space within an engine compartment when the vehicle collides with the pedestrian.

Specifically, a configuration is disclosed in which a link member is provided at either of end portions of a rear edge of the hood in such a manner as to be supported on a body's side at one end and on a hood's side at the other end thereof, and the link member is normally locked on the body's side by a lock member, whereas when the vehicle collides with a pedestrian, an actuator is activated to release the lock of the link member by the lock member and then to act to lift the hood.

Incidentally, when the hood is lifted by the actuators, the hood tends to continue to rotate further upwards than necessary by inertial force even after the raising thereof has been completed.

Then, to cope with this, a stopper mechanism is provided for restricting the rotation of the hood to a predetermined amount. As this stopper mechanism, there is known a stopper mechanism in which a racket is mounted on the body's side, and a cable is stored within the bracket with a leading end portion of the cable pulled upwards from the bracket to be fixedly connected to the hood.

When the vehicle collides with a pedestrian, while the actuators are activated to lift the hood, as this occurs, the cable of the stopper mechanism is pulled out of the bracket, and when the cable is pulled so out a predetermined amount, the cable is stretched tense, whereby the rotation of the hood is made to be stopped, as disclosed in United State Patent Application Publication No. US 2005/0257980 A1.

In the technique disclosed in United State Patent Application Publication No. US 2005/0257980 A1, however, since the stopper mechanism is provided outside the hood raising mechanisms, the space exclusive to the stopper mechanism becomes necessary, leading to a problem that the hood raising configuration cannot be made compact.

In addition, since part of the cable sticks out from an upper end portion of the bracket, the portion that so sticks out is subjected to vibration, whereby the cable vibrates at the portion in question to cause noise.

Additionally, since the hood is stopped abruptly by the cable of the stopper mechanism being stretched tense, strong impact is exerted on the hood, there being a fear that the hood is damaged.

SUMMARY

It is therefore one advantageous aspect of the invention to provide a system configured to lift a hood, which requires no separate special space for installation of a stopper, which does not vibrate even when it is subjected to vibration and which can restrict the raising amount of the hood without giving any damage thereto.

According to the invention, since a stopper is mounted in a position which is adjacent to a side portion of a connecting member while being supported pivotably on a second mounting member at one end portion and on a first mounting member at the other end portion thereof, a space defined adjacent to the side portion of the connecting member can be made use of as a space where to dispose the stopper, whereby not only can a vehicle hood raising system be made compact but also even though the stopper is subjected to vibration, no looseness is caused, and hence, noise can be reduced.

BRIEF DESCRIPTION OF THE DRAWINGS

The present invention will become more fully understood from the detailed description given hereinbelow and the accompanying drawings which are given by way of illustration only, and thus are not limitative of the present invention and wherein.

DETAILED DESCRIPTION OF THE INVENTION

Hereinafter, embodiments for carrying out the invention will be described in detail by reference to the drawings.

Figure 1:
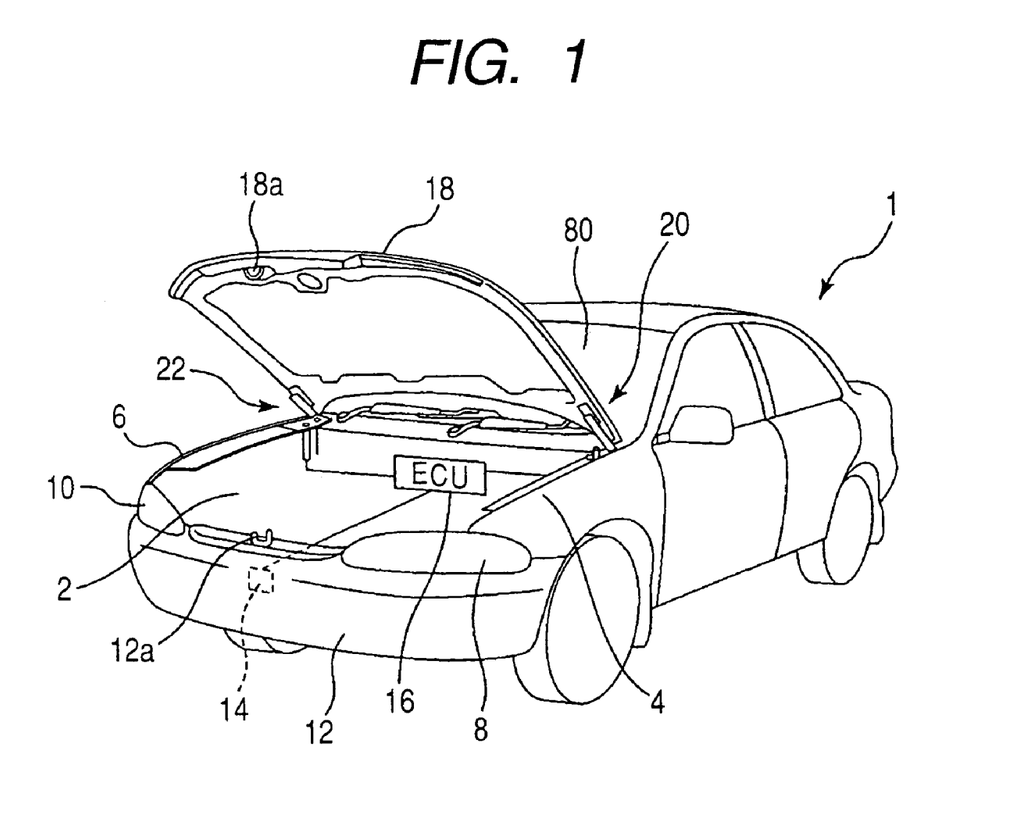
FIG. 1 is a perspective view showing a vehicle on which a vehicle hood raising system according to an embodiment of the invention is equipped.

FIG. 1 shows a vehicle provided with a hood raising system according to an embodiment of the invention.

An engine compartment 2 is formed in a front part of a body of a vehicle 1, and front fenders 4, 6 are provided on both sides of the front part of the body. Headlamps 8, 10 are provided at both transverse ends of a front end portion of the body of the vehicle 1, and a front bumper 12 is provided below the headlamps 8, 10 in such a manner as to extend in a transverse direction of the vehicle.

An impact sensor 14 (a detector) for detecting a collision with a pedestrian (an object) is provided within the front bumper 12, and this impact sensor 14 is electrically connected to an ECU 16 provided on the vehicle 1. The ECU 16 is electrically connected to various types of sensors including a vehicle speed sensor, not shown, and various types of devices and has a function to control the various devices based on pieces of information sent from the various types of sensors.

A front hood 18 (a hood) is provided on an upper side of the engine compartment 2 in such a manner as to be opened and closed. The front hood 18 is configured such that when it is fully closed, the front hood 18 is locked by a striker 18a provided at a front end of the front hood 18 being fixed by a latch 12a provided on an upper portion of the front bumper 12, while when it is normally opened, the front hood 18 is opened upwards by hood raising mechanisms 20, 22, functioning as fulcrum points, which are provided on both transverse side portions of the front hood 18 at a rear edge thereof. In this case, the hood raising mechanisms 20, 21 function as the hood hinge mechanisms of the conventional hood impact absorbing mechanism.

Figure 2:
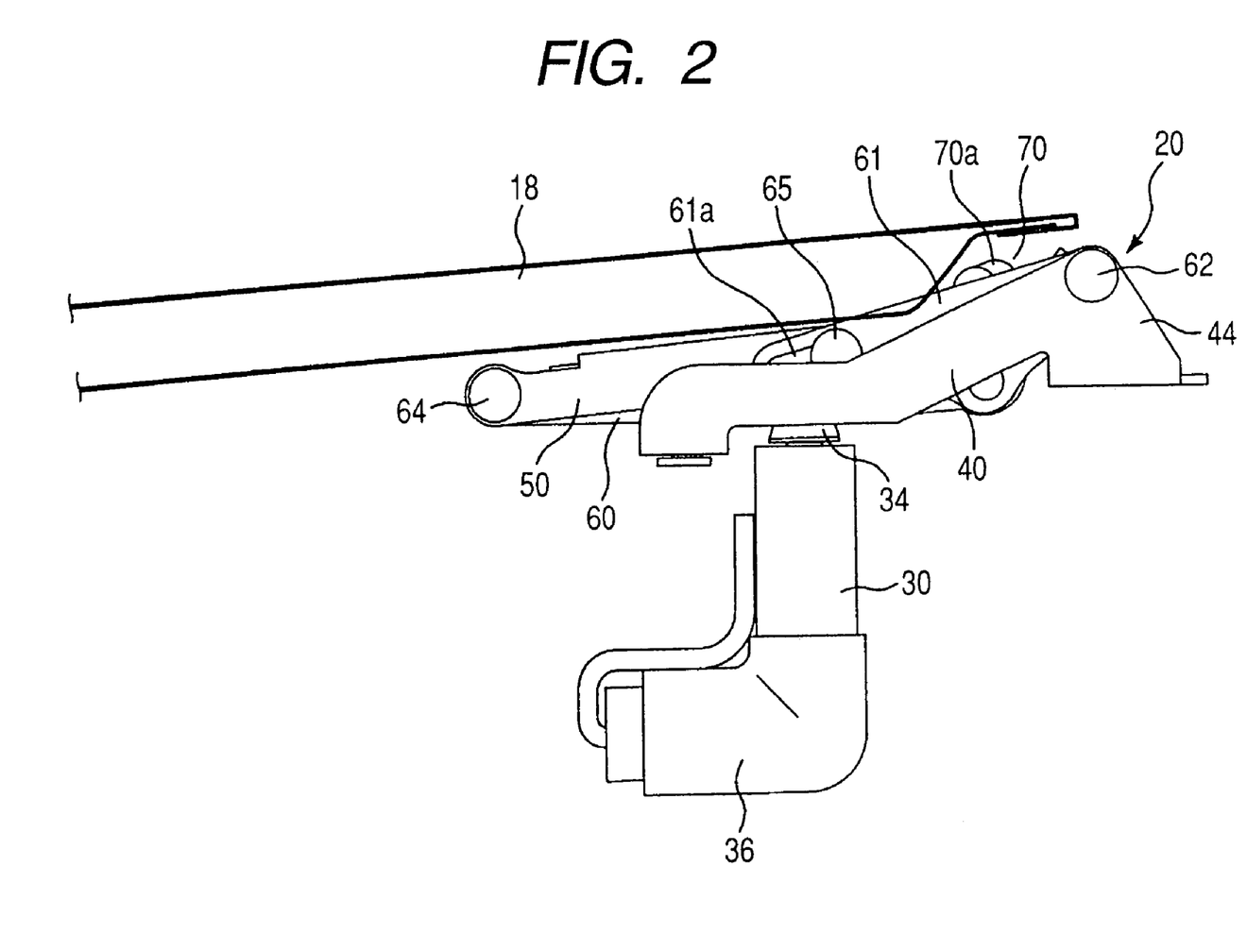
FIG. 2 is a side view showing the vehicle hood raising system in FIG. 1.
Figure 3:
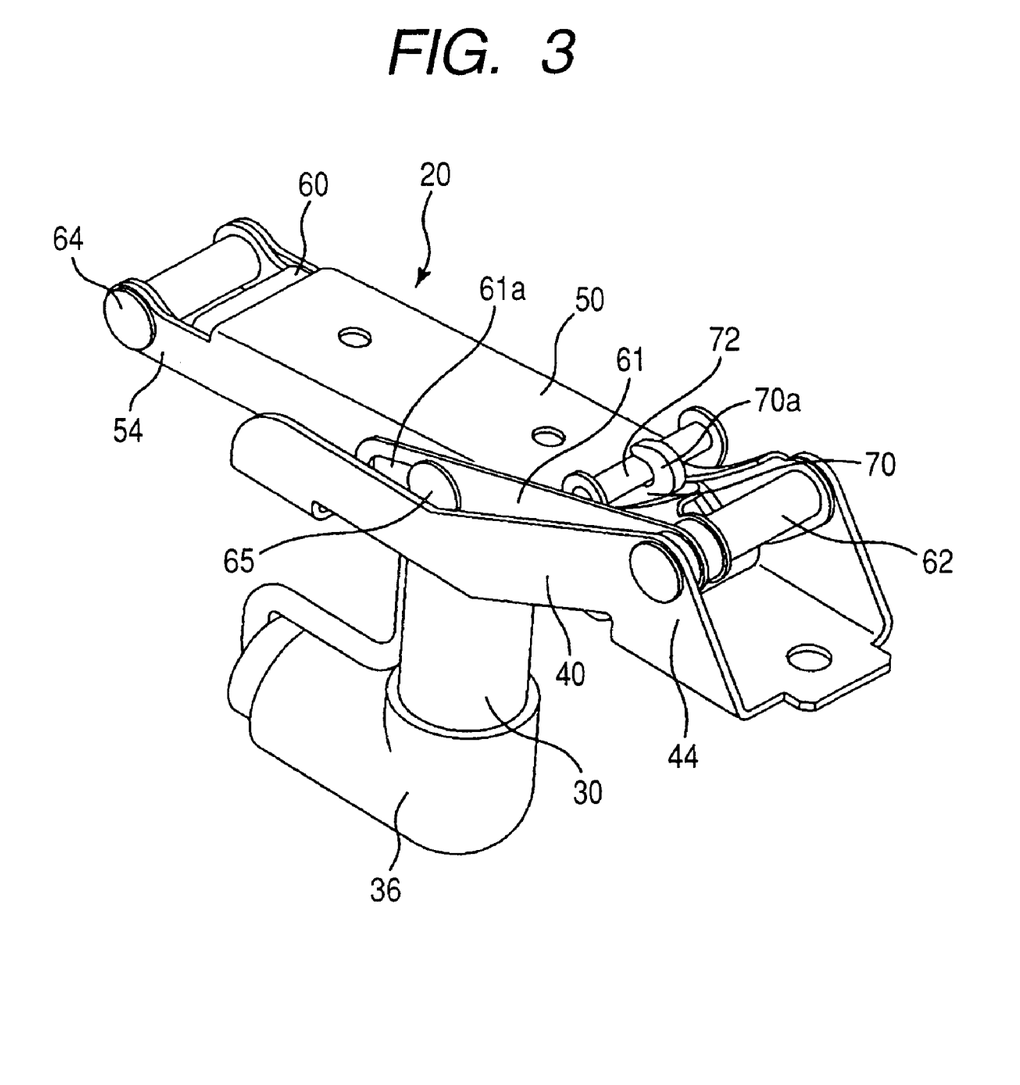
FIG. 3 is a perspective view showing the vehicle hood raising system in FIG. 1.
Figure 4:
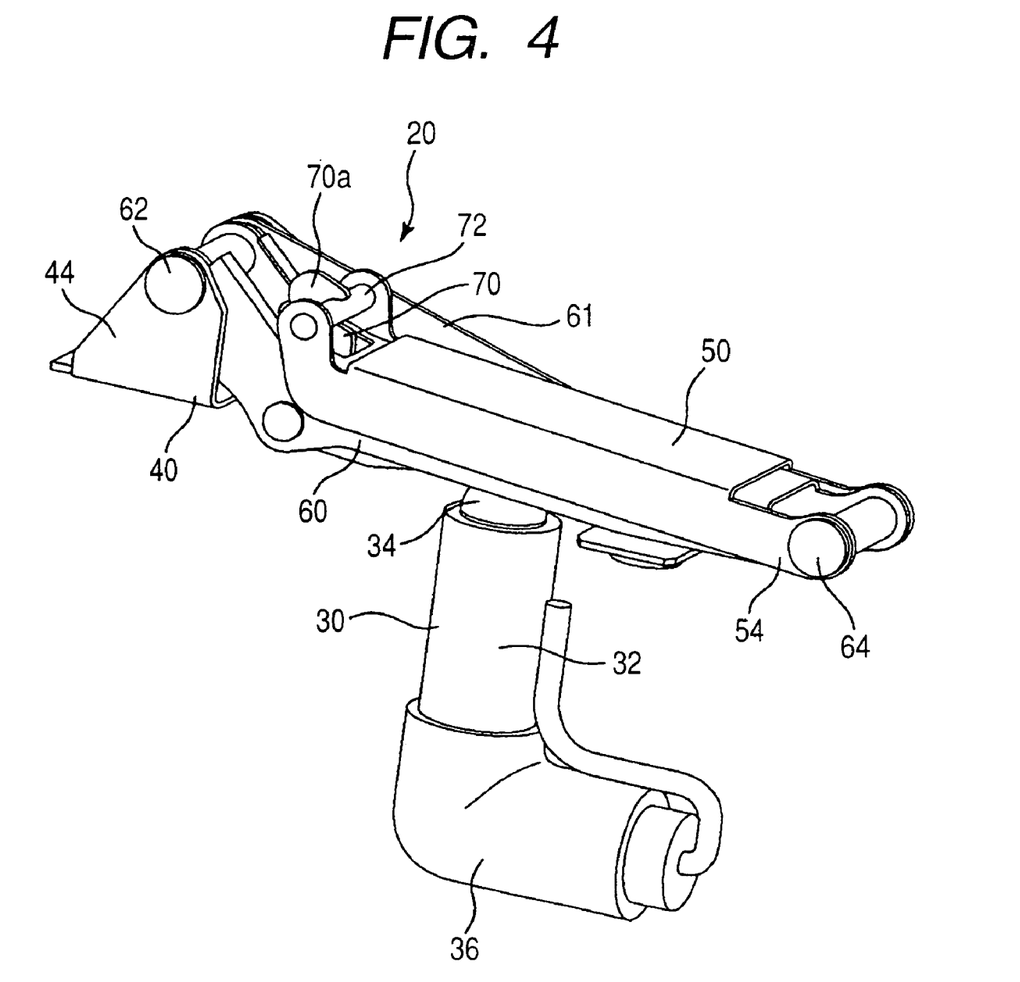
FIG. 4 is a perspective view showing the vehicle hood raising system in FIG. 1 as viewed from a different angle.

FIG. 2 is a side view of the hood raising mechanism 20 provided on the left-hand side of the vehicle as viewed from the inside of the engine compartment 2, and FIGS. 3 and 4 are perspective views of the hood raising mechanism 20 as viewed from different directions.

Note that the hood raising mechanism 22 provided on the right-hand side of the vehicle has the same configuration.

The hood raising mechanism 20 is made up of an actuator 30 and a base bracket (a second mounting member) 40 which are fixed to a body's side, a hood bracket (a first mounting member) 50 which is fixed to the front hood 18, an intermediate arm (a connecting member) 60 for connecting the hood bracket 50 and the base bracket 40 together, a plate-like stopper arm (a stopper) 61 for restricting the raising amount of the hood bracket 50, and furthermore, a lock lever 70 which is provided on the intermediate arm 60.

The actuator 30 has a cylindrical shape, is fixed to the body with its axial direction oriented in a vertical direction of the vehicle and is provided on an internal surface of the front fender 4. The actuator 30 is configured so as to include in a cylindrical outer portion 32 a rod-like piston (an operating portion) 34 which extends coaxially and a so-called pyrotechnic inflator 36 which is provided to be positioned underneath the piston 34.

In addition, the piston 34 is provided in such a state that an upper end portion of the piston 34 protrudes further upwards than the outer portion 32. In addition, the actuator 30 is electrically connected to the ECU 16, so as to be activate the inflator 36 in response to a signal sent from the ECU 16 to push the piston 34 upwards.

The base bracket 40 that has been described above is a plate member which is brought into abutment with a flat surface portion on the body's side and is fixed to the body with a bolt (not shown). An upwardly extending hinge portion 44 is provided at a rear end of the base bracket 40.

The hood bracket 50 is a plate member which is in abutment with a lower side of the front hood 18 and is fixed to the font hood 18 with a bolt (not shown). A hinge portion 54 is formed at a front end of the hood bracket 50.

The intermediate arm 60 is supported pivotably at the hinge portion 44 of the base bracket 40 via a support pin 62 at a rear end and at the hinge portion 54 of the hood bracket 50 via a support pin 64 at a front end thereof. Namely, the intermediate arm 60 is supported on the body's side at the one end and on the front hood 18's side at the other end thereof in such a manner as to rotate freely in a vertical direction with the support pins 62, 64 working as fulcrums.

Figure 5:
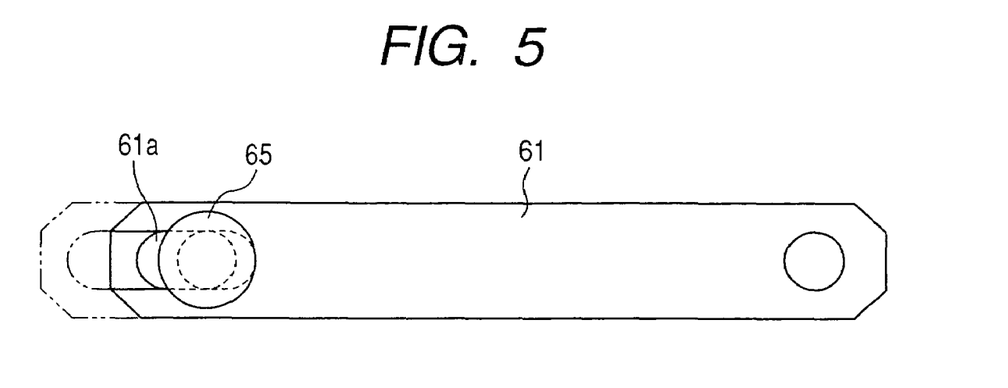
FIG. 5 is a side view showing a stopper arm for use in the vehicle hood raising system in FIG. 1.
Figure 6:
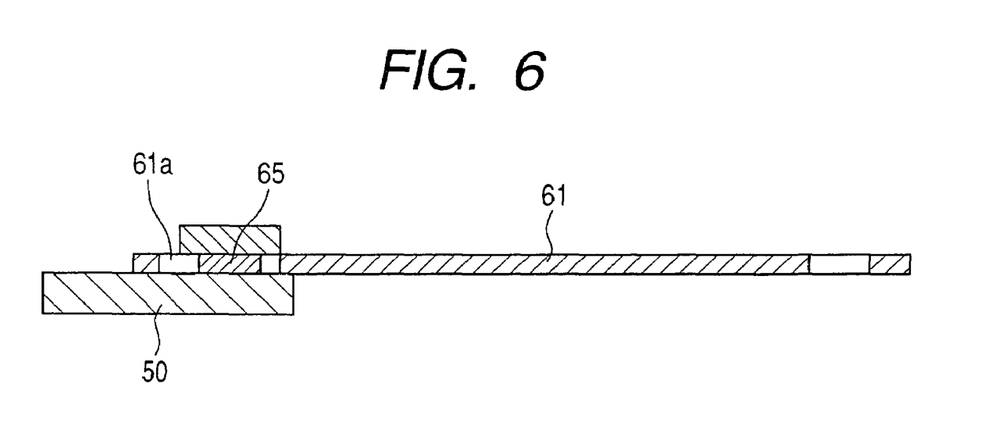
FIG. 6 is a sectioned plan view of the stopper arm in FIG. 5.

The stopper arm 61 is supported pivotably on the hinge portion 44 of the base bracket 40 via the support pin 62 at a rear end thereof in such a manner as to rotate together with the intermediate arm 60 on the support pin 62 (a first support portion) and is supported pivotably on the hood bracket 50 via a support pin 65 at a front end thereof in a position which lies further rearwards in a longitudinal direction of the vehicle than a pivot portion (the support pin 64) where the intermediate arm 60 is pivotally supported on the hood bracket 50 (a second support portion). Namely, the stopper arm 61 is disposed within a dead space lying adjacent to a side portion of the intermediate arm 60. As is shown in FIGS. 5 and 6, an elongated hole 61a is formed in the second support portion end of the stopper arm 61 in such a manner as to extend in a longitudinal direction thereof, and the support pin 65 is inserted into the elongated hole 61a. This support pin 65 is made to slide along an interior of the elongated hole 61a.

The hood raising mechanism 20 which is configured as has been described heretofore is such that when the vehicle collides with, for example, a pedestrian while it is running at a predetermined or faster vehicle speed and the collision with the pedestrian is detected by the impact sensor 14, a predetermined signal is sent from the ECU 16 to the actuator 30, so as to activate the actuator 30, whereby the hood 18 is lifted.

Hereinafter, the function of the vehicle hood raising system that is configured as has been described heretofore will be described based on FIGS. 7 to 11.

Firstly, in such a state that the front hood 18 is fully closed, as is shown in FIGS. 2 to 4, in the hood raising mechanism 20, a hook portion 70a of a lock lever 70 is in engagement with a lock pin 72 of the hood bracket 50.

Figure 7:
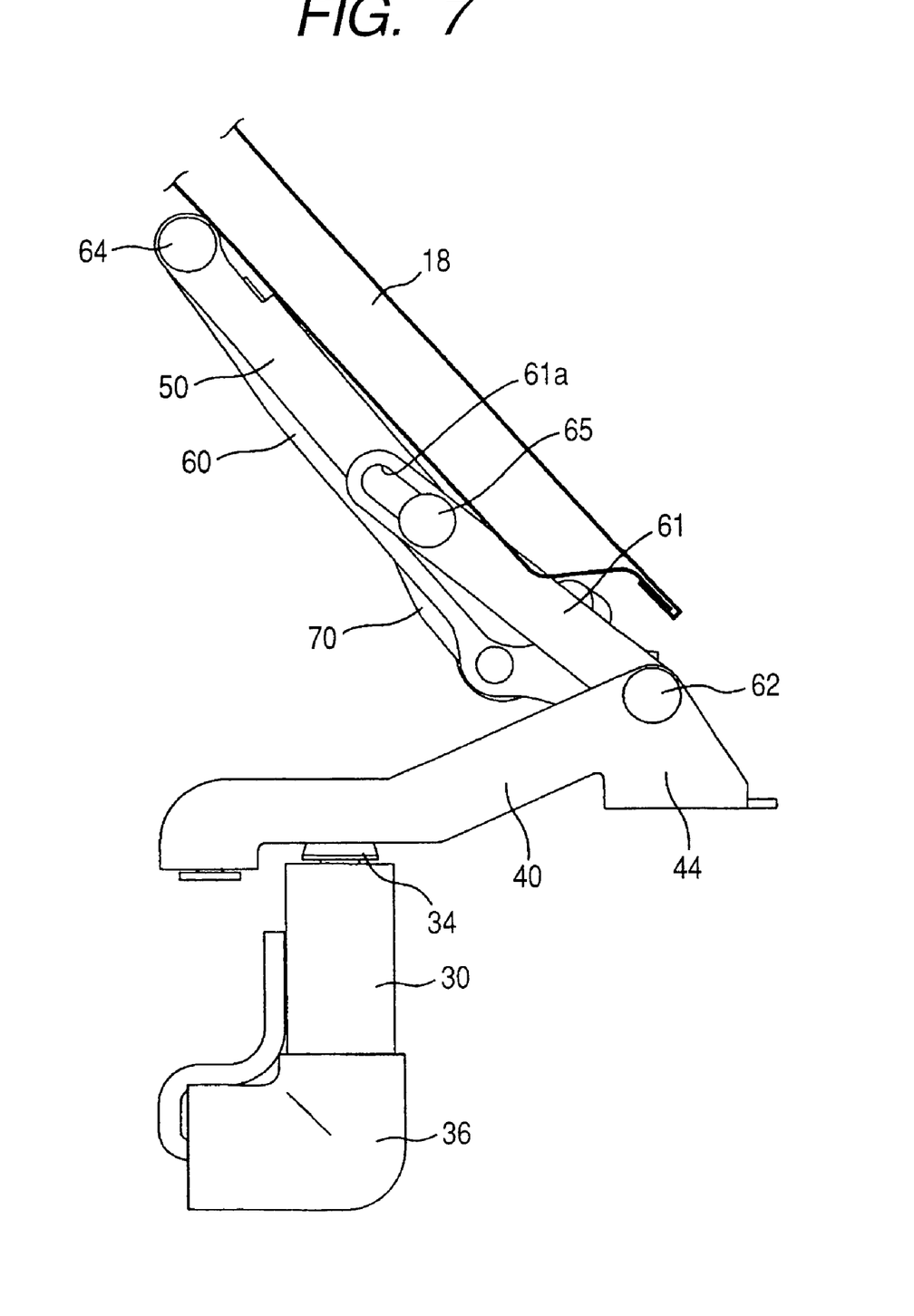
FIG. 7 is a side view showing a state in which a front hood is normally opened by the vehicle hood raising system in FIG. 1.
Figure 8:
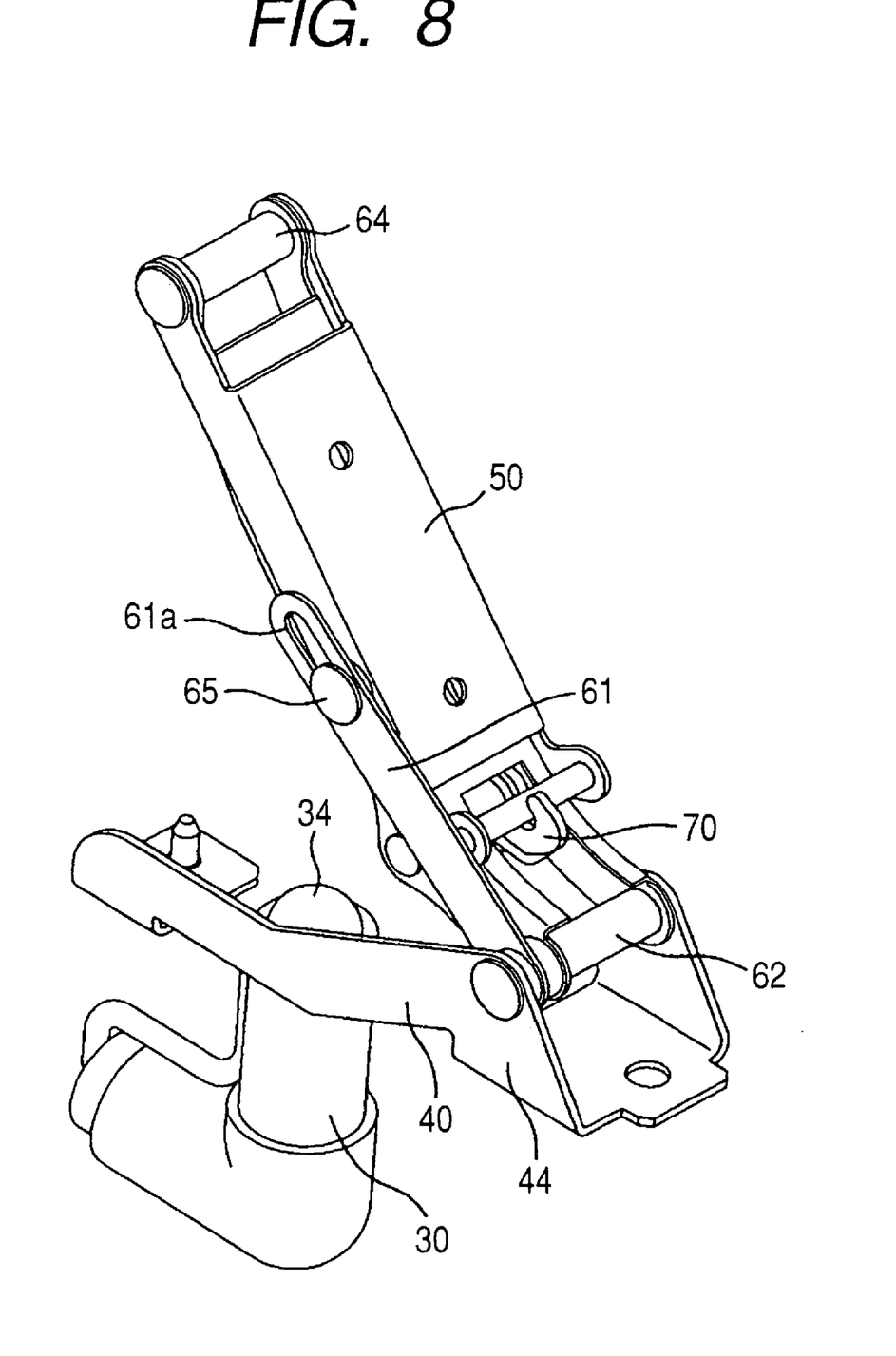
FIG. 8 is a perspective view showing the vehicle hood raising system in FIG. 7.

Then, when the latch 12a at the front end of the vehicle 1 is released to allow the front hood 18 to be opened normally, in the hood raising mechanism 20, as is shown in FIGS. 7, 8, the intermediate arm 60 and the stopper arm 61 rotate together with the hood bracket 50, that is, the front hood 18 in an upward direction of the vehicle about the support pin 62, functioning as the fulcrum, of the hinge portion 44 at the rear end of the base bracket 40 due to the hook portion 70a of the lock lever 70 being in engagement with the lock pin 72 of the hood bracket 50.

In addition, when the front hood 18 is normally opened and closed, since the stopper arm 61 rotates together with the intermediate arm 61, the distance between the first support portion and the second support portion of the stopper arm remains substantially the same between the state in which the front hood 18 is fully closed and the state in which the front hood 18 is opened.

On the other hand, when a collision of the vehicle with a pedestrian is detected by the impact sensor 14 while the vehicle is running at the predetermined or faster vehicle speed, the predetermined signal is sent from the ECU 16 to the actuator 30.

Figure 9:
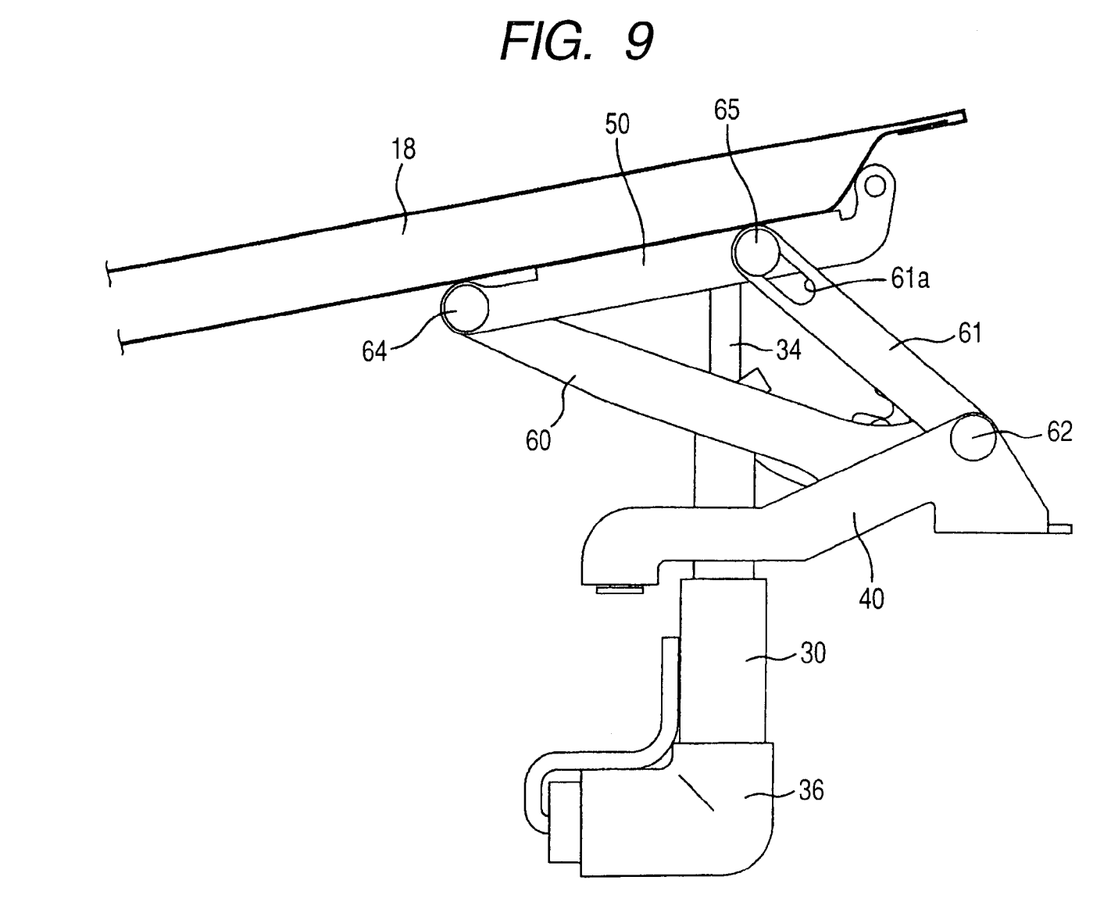
FIG. 9 is a side view showing an operation of the vehicle hood raising system in FIG. 1 when the front hood is lifted.
Figure 10:
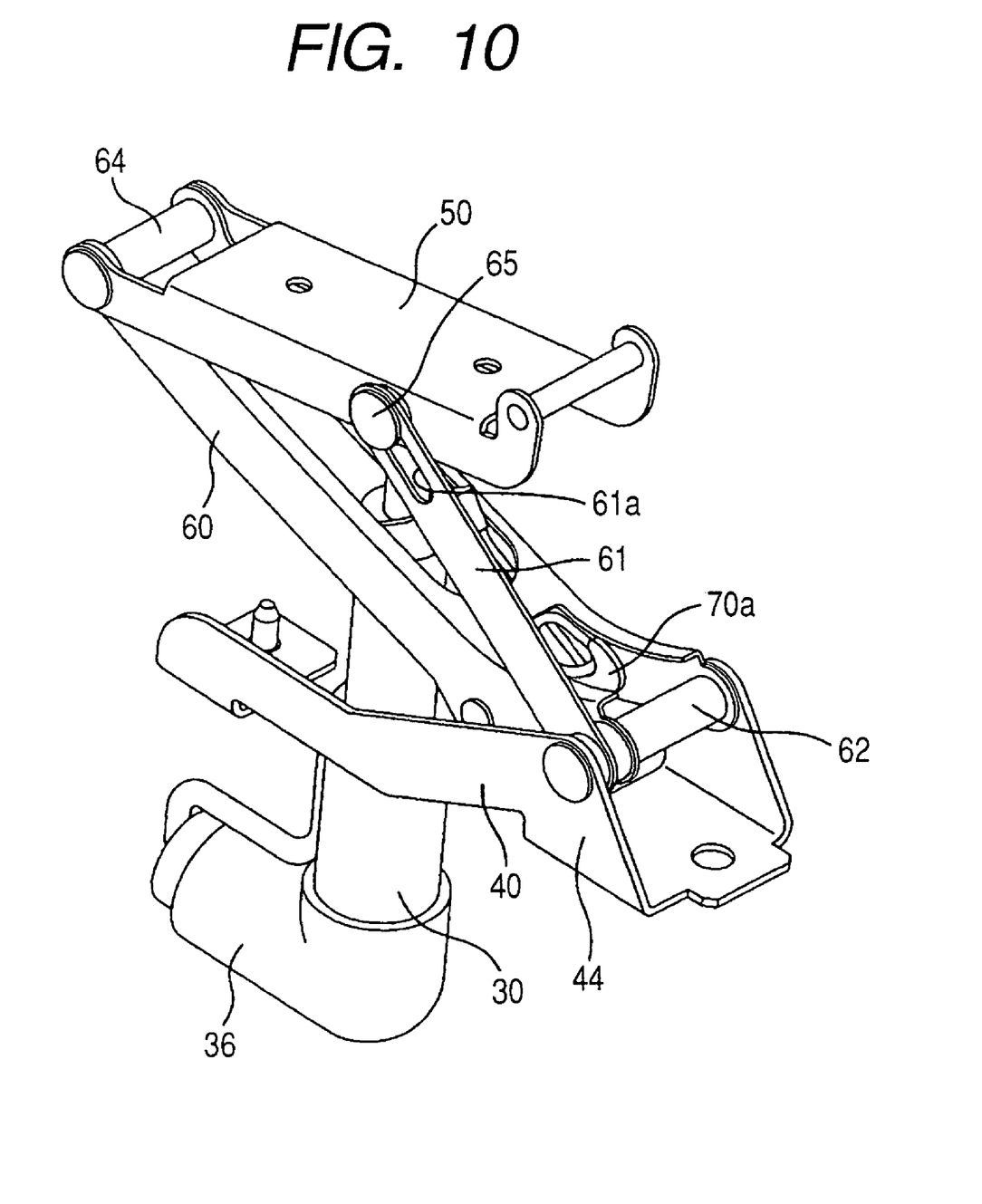
FIG. 10 is a perspective view showing the vehicle hood raising system in FIG. 9.
Figure 11:
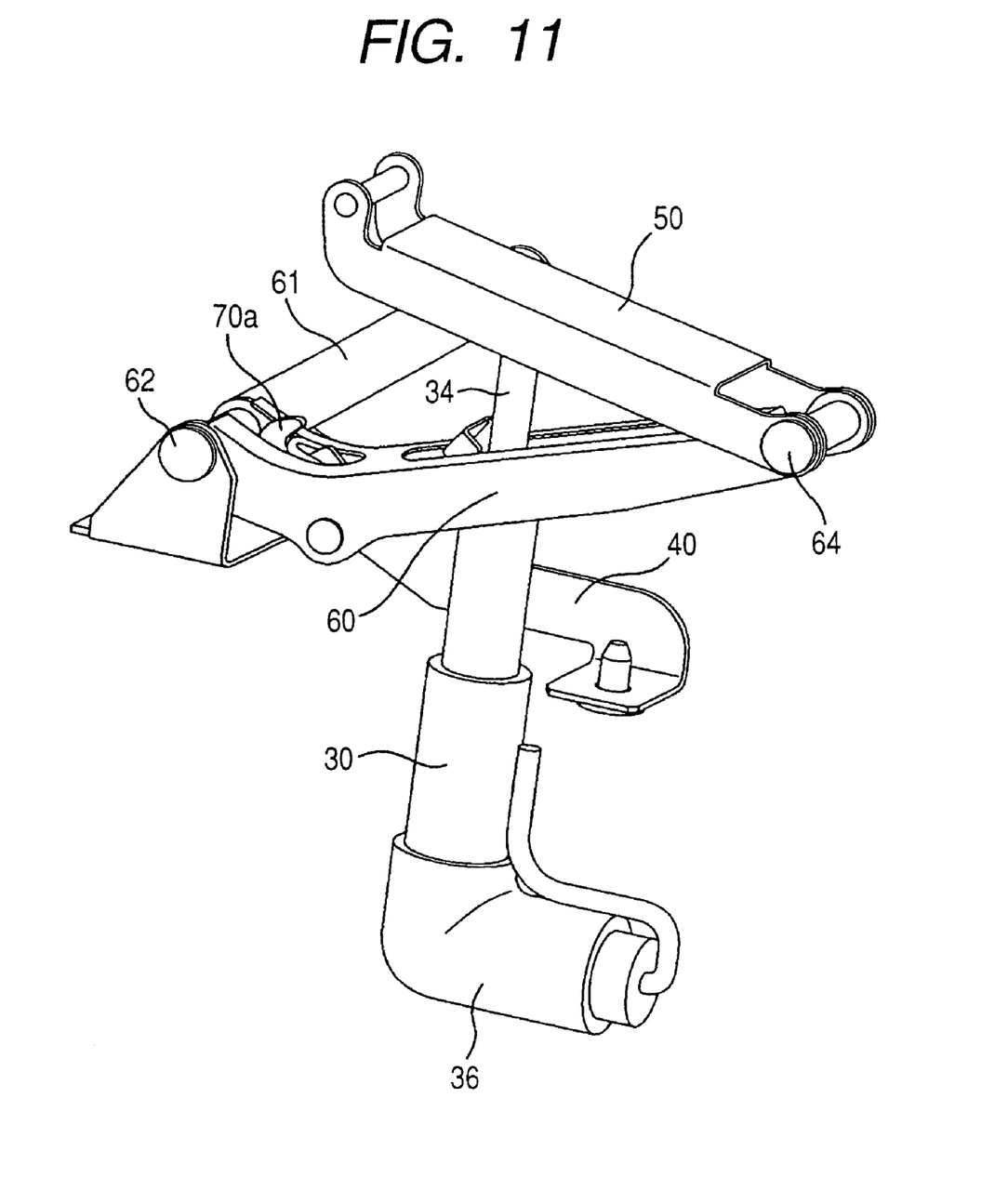
FIG. 11 is a perspective view showing the vehicle hood raising system in FIG. 9 as viewed from a different angle.

The actuator 30 which has received the signal activates the inflator 36, whereby as is shown in FIGS. 9 to 11, the piston 34 is pushed upwards. As this occurs, the front hood 18 is in the fully closed state, and an upper end face portion of the piston 34 is brought into contact with a receiving portion (not shown) of the lock lever 70 by the piston 34 being pushed upwards, and the lock lever 70 is then pushed upwards, whereby the lock lever 70 rotates against the biasing force of a torsion spring (not shown), and the hook portion 70a is then disengaged from the lock pin 72, the lock by the lock lever 70 being thereby released. When the piston 34 is pushed further upwards and the upper end face thereof is brought into contact with a lower side of the hood bracket 50, since the lock by the lock lever 70 has already be released then, the rear side of the front hood 18 is lifted upwards by the piston 34 via the hood bracket 50.

To describe in detail, the front end of the front hood 18 is fixed by the latch 12a, and when the hood bracket 50 receives an upward force from the piston 34, the intermediate arm 60 and the stopper arm 61 rotate on the support pin 62 as the fulcrum relative to the base bracket 40, and the hood bracket 50 rotates about the support pin 64 relative to the intermediate arm 60, whereby the rear side of the front hood 18 is lifted. Then, the support pin 62, the support in 64 and the support pin 65 forms a triangle. A tension is generated in the stopper arm 61 between the first support portion via the support pin 62 and the second support portion via the support pin 65 by the front hood 18 being lifted, and the stopper arm 61 restrict the raising amount of the front hood 18 against the tension so generated. Specifically, when a force is exerted on the stopper pin 61 at the second support portion via the support pin 65, the stopper pin 61 deforms in the direction in which the force is exerted and gradually decreases the raising speed of the front hood 18 to stop the raising of the front hood 18 in the end.

A space between the front hood 18 and the various devices such as the engine which are provided within the engine compartment 2 is expanded when the rear side of the front hood 18 is lifted and stopped in the way described above, thereby making it possible to reduce impact generated when the pedestrian hits the front hood 18.

In addition, the raising amount of the rear side of the front hood 18 can be adjusted only by changing the distance between the support pin 64 and the support pin 65.

Next, a case will be described in which the vehicle strongly collides with not a pedestrian but a vehicle or other structure.

Figure 12:
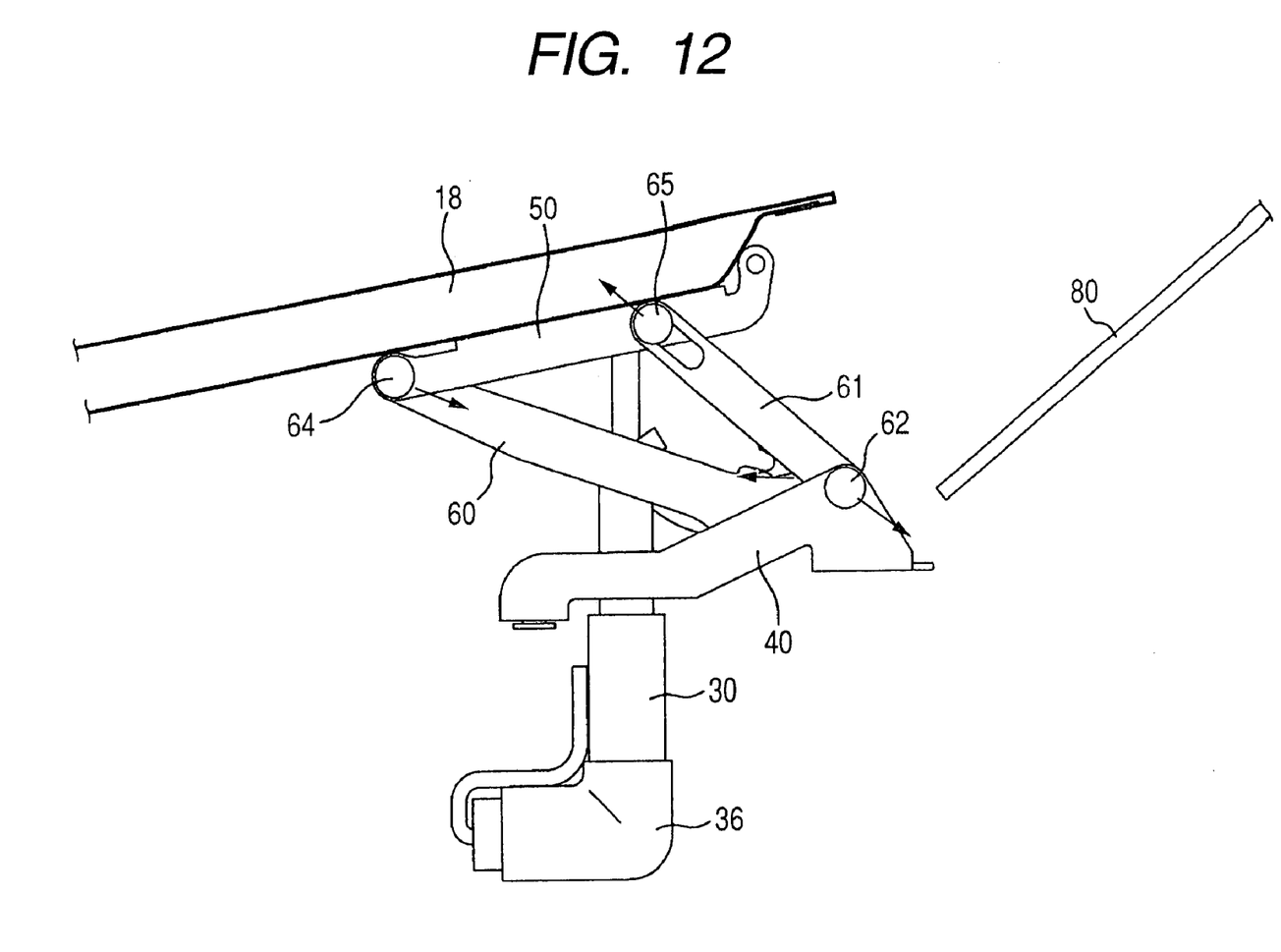
FIG. 12 is a side view showing an operation of the vehicle hood raising system in FIG. 1 when a vehicle is brought into strong collision with a structure.

In this case, not only is the front hood 18, of course, lifted in a similar manner to that described above but also the front hood 18 is forced to move rearwards while being bent due to the front part of the body being crushed to be likely to strike a windshield 80 shown in FIG. 12.

As this occurs, however, since the triangle is formed by the support pin 62, the support pin 64 and the support pin 65, the intermediate arm 60 receives a force in the direction in which it is compressed, while the stopper arm 61 receives the force in the direction in which it is stretched, whereby the rearward motion of the front hood 18 is restricted. By this action, the front hood 18 is prevented from striking the windshield 80, whereby the safety of the driver is ensured.

As has been described heretofore, according to this embodiment, since the plate-like stopper arm 61 is mounted in such a manner as to be supported pivotably on the base bracket 40 at the one end portion and on the hood bracket 50 at the other end portion thereof, the dead space defined adjacent to the side portion of the intermediate arm can be made use of as a space where to dispose the stopper, whereby not only can the vehicle hood raising system be made compact but also even though the stopper is subjected to vibration, no looseness is caused, and hence, noise can be reduced.

In addition, the stopper arm 61 is built in between the base bracket 40 and the hood bracket 50 in advance, no special mounting step for the stopper arm 61 becomes necessary in the production line, thereby the production process being simplified.

Additionally, when the stopper arm 61 receives the force via the support pin 65 in association with the front hood 18 being lifted, since the stopper arm 61 gradually decreases the raising speed of the front hood 18 to stop the raising of the front hood 18 in the end, the front hood 18 can be stopped from being lifted without a strong impact being exerted thereon, no damage being thereby imparted to the hood.

In addition, when the front hood 18, which is lifted through a malfunction or the like, is made to return to its initial position, since the support pin 65 shifts along the elongated hole 61a in the stopper arm 61, there occurs no situation in which the stopper arm 61 disturbs the returning operation of the front hood 18, thereby making it possible to facilitate the return of the front hood 18 to its initial position.

Furthermore, when the front hood 18 is normally opened and closed, the stopper arm 61 is in no case brought into sliding contact with the other members, thereby making it possible to prevent the generation of noise.

In addition, where the vehicle is brought into strong collision with not a pedestrian but a vehicle or other structure and the front part of the body is crushed, forcing the front hood 18 to move rearwards, the rearward motion of the front hood 18 can be restricted by the intermediate arm 60 and the stopper arm 61, whereby the front hood 18 can be prevented from striking the windshield 80.

Figure 13:
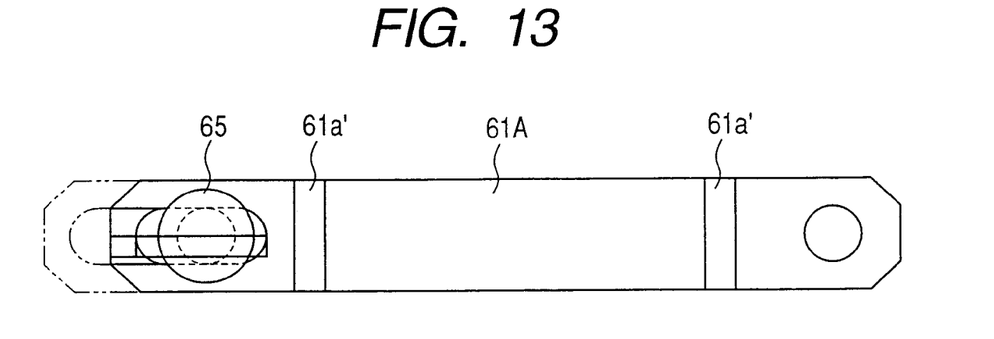
FIG. 13 is a side view showing a first modified example of a stopper arm for use in the vehicle hood raising system in FIG. 1.
Figure 14:
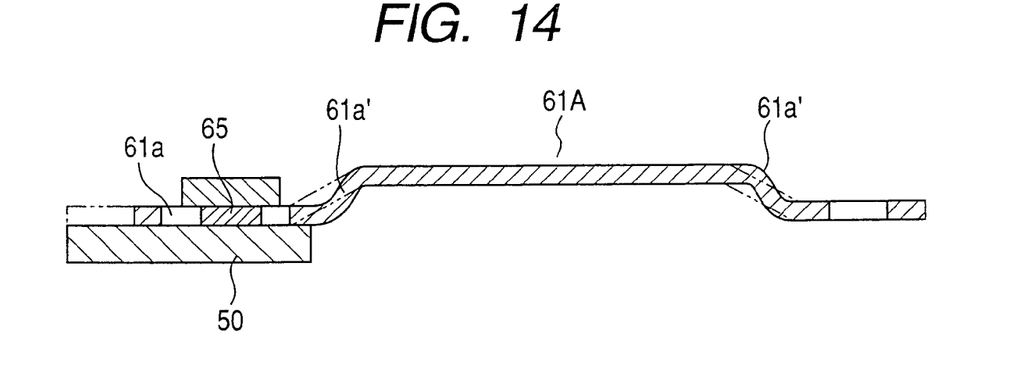
FIG. 14 is a sectioned plan view of the stopper arm in FIG. 13.

FIG. 13 is a side view showing a first modified example of a stopper arm, and FIG. 14 is a sectioned plan view of the stopper of the modified example.

This stopper arm 61A is formed to be bent in such a manner as to have a difference in level or a stepped portion 61a' between either of both end portions and an intermediate portion thereof. When the stopper arm 61A receives a tension via the support pin 65 in association with the front hood 18 being lifted, the stopper arm 61A is stretched while deforming in such a way that the inclination angle of the stepped portion 61a' becomes less steep.

According to this modified example, the stopper arm 61A is made to deform more easily relative to the tension generated therein, whereby the raising amount of the front hood 18 can be restricted without imparting any impact to the front hood 18.

Figure 15:
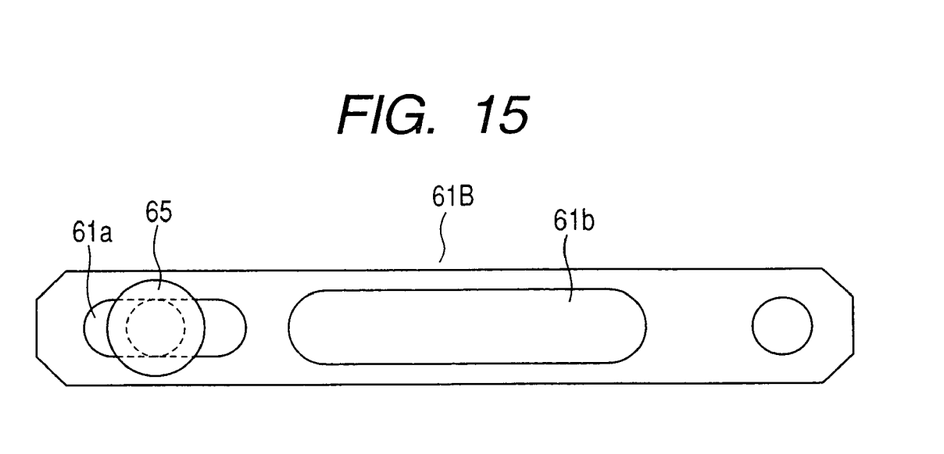
FIG. 15 is a side view showing a second modified example of a stopper arm for use in the vehicle hood raising system in FIG. 1.
Figure 16:
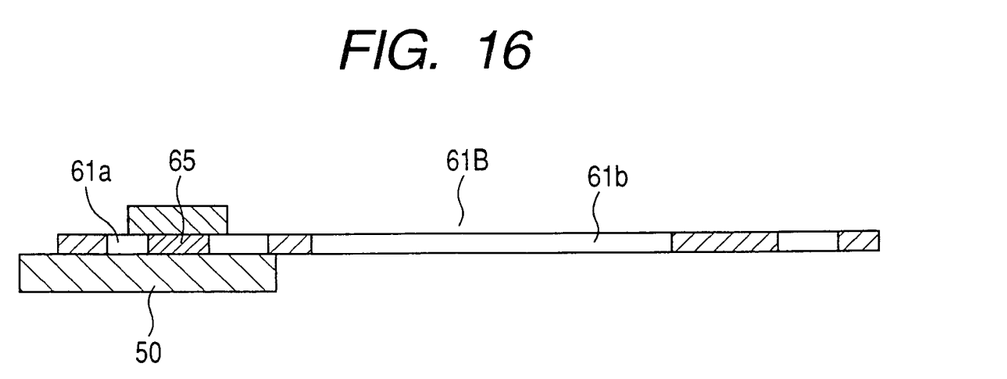
FIG. 16 is a sectioned plan view of the stopper arm in FIG. 15.

FIG. 15 is a side view showing a second modified example of a stopper arm and FIG. 16 is a sectioned plan view of the stopper arm of the modified example.

This stopper arm 61B has an elongated hole 61b which is formed largely in an intermediate portion in such a manner as to extend along a longitudinal direction thereof, and when the stopper arm 61B receives a tension via the support pin 65 in association with the front hood 18 being lifted, the stopper arm 61B is stretched while the portion of the stopper arm 61B where the elongated hole 61b is formed is made to deform in the axial direction.

According to this modified example, the stopper arm 61B is made to deform more easily relative to the tension exerted thereon, whereby the raising amount of the front hood 18 can be restricted without imparting any impact to the front hood 18.

Figure 17:
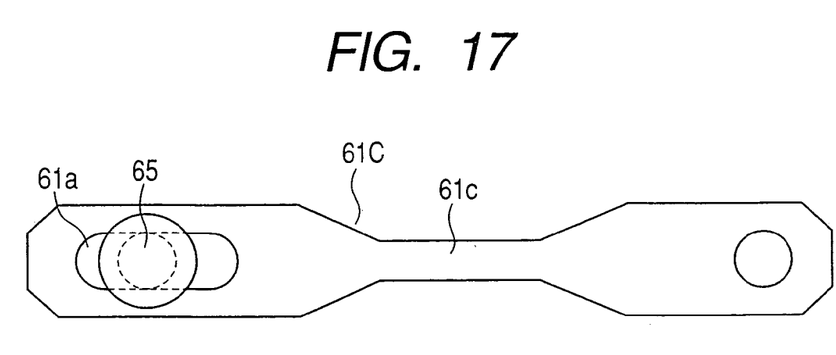
FIG. 17 is a side view showing a third modified example of a stopper arm for use in the vehicle hood raising system in FIG. 1.
Figure 18:
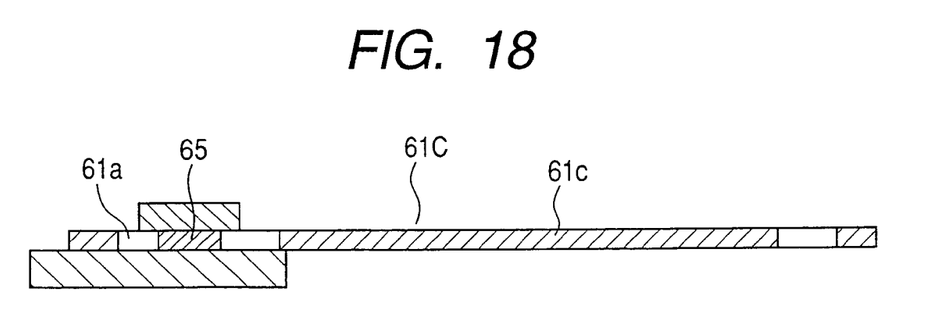
FIG. 18 is a sectioned plan view of the stopper arm in FIG. 17.

FIG. 17 is a side view showing a third modified example of a stopper arm, and FIG. 18 is a sectioned plan view of the stopper arm of the modified example.

This stopper 61C has an intermediate portion which is made narrower than both end portions thereof, and when the stopper arm 61C receives a tension via the support pin 65 in association with the front hood 18 being lifted, the stopper arm 61C is stretched while the narrow intermediate portion 61c is made to deform in the axial direction.

According to this modified example, the stopper arm 61C is also made to deform more easily relative to the tension exerted thereon, whereby the raising amount of the front hood 18 can be restricted without imparting any impact to the front hood 18.

In addition, the stopper is built in between the second mounting member and the first mounting member in advance, no special mounting step for the stopper becomes necessary in the production line, thereby the production process being simplified.

Additionally, since the supporting portion where the stopper is supported on the first mounting member is positioned further rearwards than the supporting portion where the connecting member is supported on the first mounting member, a triangle is formed by three points of the supporting portion where the second mounting member, the connecting member and the stopper are supported (the stopper and the connecting member are supported coaxially), the supporting portion where the connecting member is supported on the first mounting member and the supporting portion where the stopper is supported on the first mounting member when the hood is lifted, whereby the lifted amount of the hood can be adjusted and restricted in a more ensured fashion.

In addition, since when the hood is normally opened, the distance between the third portion and the fourth portion is maintained, no load is exerted on the stopper when the hood is normally opened and closed, whereby not only can the durability of the stopper be increased but also the generation of noise due to wear of the supporting portions can be suppressed.

Additionally, when the stopper receives an impact via the support pin when the hood is lifted, since the stopper gradually decelerates the raising speed of the hood to stop the rise of the hood, the hood can be stopped without a strong impact being imposed on the hood, no damage being thereby given to the hood.

In addition, when the hood that has been lifted due to a malfunction is returned to its initial position, since the support pin shifts along the slit in the stopper, there is caused no situation in which the stopper disturbs the return operation of the hood, whereby the hood can be made to return to its initial position with ease.

Furthermore, when the hood is normally opened and closed, the stopper is in no case brought into sliding contact with the other members, thereby the generation of noise being prevented.

In addition, when the vehicle is brought into strong collision with not a pedestrian but a vehicle or other structure, whereby a front part of the body is crushed to such an extent that the hood is forced to move rearwards, the rearward motion of the hood can be restricted by the connecting member and the stopper, thereby making it possible to prevent the hood from striking the windshield.

Note that this invention is not limited to the embodiment and the modified examples, and when carrying out the invention, the invention can be specified by modifying the constituent elements without departing from the spirit and scope thereof. In addition, by combining the constituent elements disclosed in the embodiment as required, various inventions can be formed. For example, some constituent elements may be deleted from the whole constituent elements shown in the embodiment. Furthermore, constituent elements of different embodiments may be combined together as required.

What is claimed is:

1. A vehicle hood raising system comprising:
    a hood provided at a front of a vehicle;
    a hood-side mounting member provided at a rear of the hood and a body-side mounting member provided on a body;
    a connecting member supported rotatably on the body-side mounting member at one end portion and on the hood-side mounting member at the other end portion thereof;
    a collision detecting unit for detecting a collision of the vehicle with an impacted object;
    an actuator having an operating portion and adapted to raise the operating portion based on a detection of a collision of the vehicle with the impacted object by the collision detecting unit so as to be brought into abutment with the hood or the hood-side mounting member to thereby raise a rear side of the hood; and
    a stopper supported rotatably on the body-side mounting member coaxially with the connecting member through a first support portion and supported rotatably on the hood-side mounting member in a position lying further rearwards than a pivotal support portion between the hood-side mounting member and the connecting member through a second support portion for restricting the rising amount of the hood when the hood is raised; wherein
    the stopper has a first elongated hole for inserting the second support portion to move the same along a longitudinal direction.

2. A vehicle hood raising system according to claim 1, wherein
    the stopper is a plate-like member.

3. A vehicle hood raising system according to claim 1, wherein
    the stopper is formed in such a manner that differences in level are respectively provided between an end portion on a side of the first support portion and an intermediate portion and between the intermediate portion and an end portion on a side of the second support portion so that the end portion on the side of the first support portion would be on one same plane with the end portion on the side of the second support portion to form the intermediate portion into a convex shape.

4. A vehicle hood raising system according to any one of claim 1, wherein
    the stopper has a second elongated hole which is different from the first elongated hole and formed in the intermediate portion in such a manner as to extend along the longitudinal direction.

5. A vehicle hood raising system according to any one of claim 1, wherein
    the stopper has a narrow portion which is formed in the intermediate portion in such a manner as to extend along the longitudinal direction.

* * * * *